(12) United States Patent
Ye et al.

(10) Patent No.: US 9,906,147 B2
(45) Date of Patent: Feb. 27, 2018

(54) ADAPTIVE DEAD TIME CONTROL APPARATUS AND METHOD FOR SWITCHING POWER CONVERTERS

(75) Inventors: Liming Ye, Frisco, TX (US); Hengchun Mao, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 118 days.

(21) Appl. No.: 13/280,248

(22) Filed: Oct. 24, 2011

(65) Prior Publication Data
US 2013/0063985 A1     Mar. 14, 2013

Related U.S. Application Data

(60) Provisional application No. 61/534,797, filed on Sep. 14, 2011.

(51) Int. Cl.
*H02M 1/38* (2007.01)
*H02M 3/335* (2006.01)

(52) U.S. Cl.
CPC ........... *H02M 3/3353* (2013.01); *H02M 1/38* (2013.01); *H02M 3/33546* (2013.01)

(58) Field of Classification Search
CPC ........... H02M 3/3353; H02M 3/33546; H02M 3/33592; H02M 2001/385; H02M 1/38
USPC ......... 363/21.06, 21.14, 78, 84, 89, 90, 125, 363/127, 21.04–21.1, 21.12–21.18
See application file for complete search history.

(56) References Cited

U.S. PATENT DOCUMENTS

| | | | |
|---|---|---|---|
| 4,347,740 A * | 9/1982 | Townsend | G01F 23/263 324/677 |
| 5,303,138 A * | 4/1994 | Rozman | 363/21.06 |
| 5,726,869 A * | 3/1998 | Yamashita et al. | 363/21.06 |
| 6,191,964 B1 * | 2/2001 | Boylan et al. | 363/89 |
| 6,381,152 B1 * | 4/2002 | Takahashi et al. | 363/21.06 |
| 6,809,939 B1 * | 10/2004 | Yang | 363/21.14 |
| 7,050,310 B2 * | 5/2006 | Yang | 363/21.06 |
| 7,206,208 B1 * | 4/2007 | Hsu et al. | 363/21.06 |
| 7,212,418 B1 * | 5/2007 | Hsu et al. | 363/53 |
| 7,864,548 B2 * | 1/2011 | Lin et al. | 363/21.06 |
| 8,139,380 B2 * | 3/2012 | Sato | 363/21.14 |

(Continued)

FOREIGN PATENT DOCUMENTS

| CN | 101494418 A | 7/2009 |
|---|---|---|
| CN | 101505108 A | 8/2009 |

OTHER PUBLICATIONS

International Search Report and Written Opinion of Patent Cooperation Treaty, International Application No. PCT/CN2012/081402, Applicant Huawei Technologies Co., Ltd., et al., dated Dec. 20, 2012, 11 pages.

(Continued)

*Primary Examiner* — Timothy J Dole
*Assistant Examiner* — Ivan Laboy Andino
(74) *Attorney, Agent, or Firm* — Slater Matsil, LLP

(57) ABSTRACT

An embodiment apparatus comprises a secondary synchronous rectifier and a secondary gate drive controller coupled to a transformer winding. The secondary gate drive controller is configured to generate a forward gate drive signal for the forward switch and generate a freewheeling gate drive signal for the freewheeling switch, wherein the secondary gate drive controller generates a dead time between the forward gate drive signal and the freewheeling gate drive signal.

17 Claims, 7 Drawing Sheets

(56) References Cited

U.S. PATENT DOCUMENTS

| | | | |
|---|---|---|---|
| 8,305,785 B2* | 11/2012 | Nishino | 363/89 |
| 2002/0191422 A1* | 12/2002 | Takagi et al. | 363/21.06 |
| 2005/0174819 A1* | 8/2005 | Yang | 363/127 |
| 2005/0180178 A1* | 8/2005 | Yang | 363/21.06 |
| 2008/0002441 A1* | 1/2008 | Allinder | 363/21.14 |
| 2009/0168464 A1* | 7/2009 | Lin et al. | 363/21.06 |
| 2009/0244942 A1* | 10/2009 | Huang | H02M 3/33592 363/89 |

OTHER PUBLICATIONS

"Voltage Mode Active Clamp Controller," Data Sheet, LM5027, National Semiconductor Corporation, Nov. 23, 2009, 28 Pages.
"Voltage Mode Active Clamp Controller," Data Sheet, LM5027A, National Semiconductor Corporation, Jul. 19, 2010, 28 Pages.

\* cited by examiner

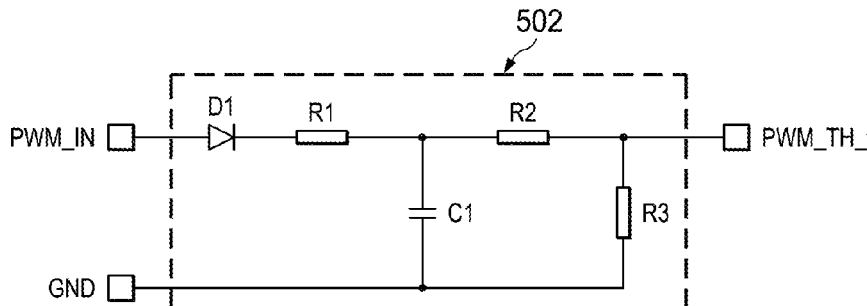
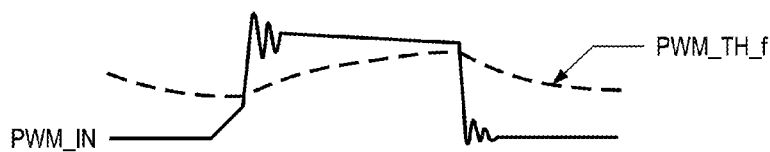
FIG. 5
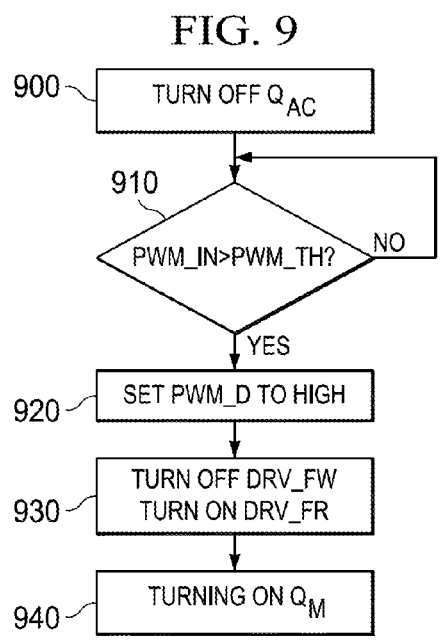
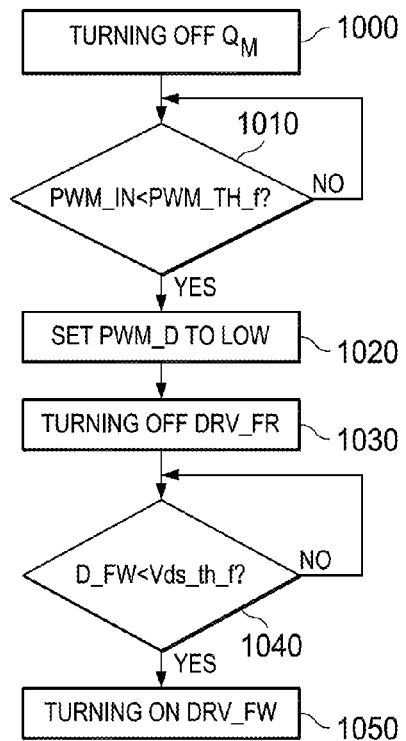

ADAPTIVE DEAD TIME CONTROL APPARATUS AND METHOD FOR SWITCHING POWER CONVERTERS

This application claims the benefit of U.S. Provisional Application No. 61/534,797, filed on Sep. 14, 2011, entitled "Adaptive Dead Time Control Apparatus and Method for Switching Power Converters," which application is hereby incorporated herein by reference.

TECHNICAL FIELD

The present invention relates to an apparatus and method for pulse width modulation (PWM) control, and, in particular embodiments, to an adaptive dead time control apparatus and method for synchronous rectification in switching power converters.

BACKGROUND

A telecommunication network power system usually includes an ac-dc stage converting the power from the ac utility line to a 48V dc distribution bus and a dc/dc stage converting the 48V dc distribution bus to a plurality of voltage levels for all types of telecommunication loads. A conventional ac-dc stage may comprise a variety of EMI filters, a bridge rectifier formed by four diodes, a power factor correction circuit and an isolated dc/dc power converter. The dc/dc stage may comprise a plurality of isolated dc/dc converters. Isolated dc/dc converters can be implemented by using different power topologies, such as LLC resonant converters, flyback converters, forward converters, half bridge converters, full bridge converters and the like.

Active clamp forward converters are widely adopted for small to medium power level isolated power converters in the telecommunications and data communications industries. Higher efficiency is increasingly demanded in small and medium power level isolated power converters. When active clamp forward converters operate in a synchronous rectifier mode, there may be a dead time period between a turn-on period of forward switch and a turn-on period of a freewheeling switch. More particularly, for example, during the dead time period, the freewheeling switch is not turned on and the forward switch has already been turned off. The output current of the active clamp forward converter is flowing through the body diode of the freewheeling switch. The body diode of a metal oxide semiconductor field effect transistor (MOSFET) device has a higher forward voltage drop and slow reverse recovery characteristic. Such a higher forward voltage drop and slow reverse recovery characteristic may result in extra power losses. An adaptive dead time control mechanism may help to reduce the conduction time of body diodes so as to increase efficiency.

SUMMARY OF THE INVENTION

These and other problems are generally solved or circumvented, and technical advantages are generally achieved, by preferred embodiments of the present invention which provide an adaptive dead time control apparatus and method of a secondary side synchronous rectifier in an isolated power converter.

In accordance with an embodiment, an apparatus comprises a secondary synchronous rectifier and a secondary gate drive controller. The secondary synchronous rectifier is coupled to a secondary side of a power converter comprising a forward switch and a freewheeling switch. The secondary gate drive controller coupled to a transformer winding of the power converter provides a forward gate drive signal for the forward switch and a freewheeling gate drive signal for the freewheeling switch, wherein the secondary gate drive controller generates a dead time between the forward gate drive signal and the freewheeling gate drive signal.

In accordance with another embodiment, a system comprises a transformer, a secondary synchronous rectifier and a secondary gate drive controller. The transformer of a power converter has a primary winding coupled to a dc power source through a primary switch and a secondary winding coupled to an output filter.

The secondary synchronous rectifier is coupled between the secondary winding and the output filter. The secondary synchronous rectifier comprises a forward switch and a freewheeling switch. The secondary gate drive controller coupled to a transformer winding provides a forward gate drive signal for the forward switch and a freewheeling gate drive signal for the freewheeling switch, wherein the secondary gate drive controller generates a dead time between the forward gate drive signal and the freewheeling gate drive signal.

In accordance with yet another embodiment, a method comprises detecting a switching pulse from a transforming winding of a power converter, generating a forward switch gate drive signal for the power converter, generating a freewheeling switch gate drive signal complementary to the forward switch gate drive signal for the power converter and generating a dead time between the forward switch gate drive signal and the freewheeling switch gate drive signal.

An advantage of an embodiment of the present invention is an adaptive dead time control apparatus and method helps to reduce the conduction time of body diodes so as to increase the efficiency of an isolated dc/dc converter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 illustrates a schematic diagram of a half wave rectifier for generating an internal threshold waveform in accordance with an embodiment;

FIG. 9 illustrates a flow chart of a synchronous rectifier adaptive dead time control scheme in accordance with an embodiment; and FIG. 10 illustrates a flow chart of a synchronous rectifier dead time control scheme in accordance with another embodiment.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely an adaptive dead time control apparatus and method for a secondary synchronous rectifier of an active clamp forward converter. The invention may also be applied, however, to a variety of isolated dc/dc power converters including half bridge converters, full bridge converters, flyback converters, forward converters, push-pull converters and the like. Furthermore, the invention may also be applied to a variety of non-isolated power converters such as buck switching converters, boost switching converters, buck-boost switching converters and the like.

Figure 1:
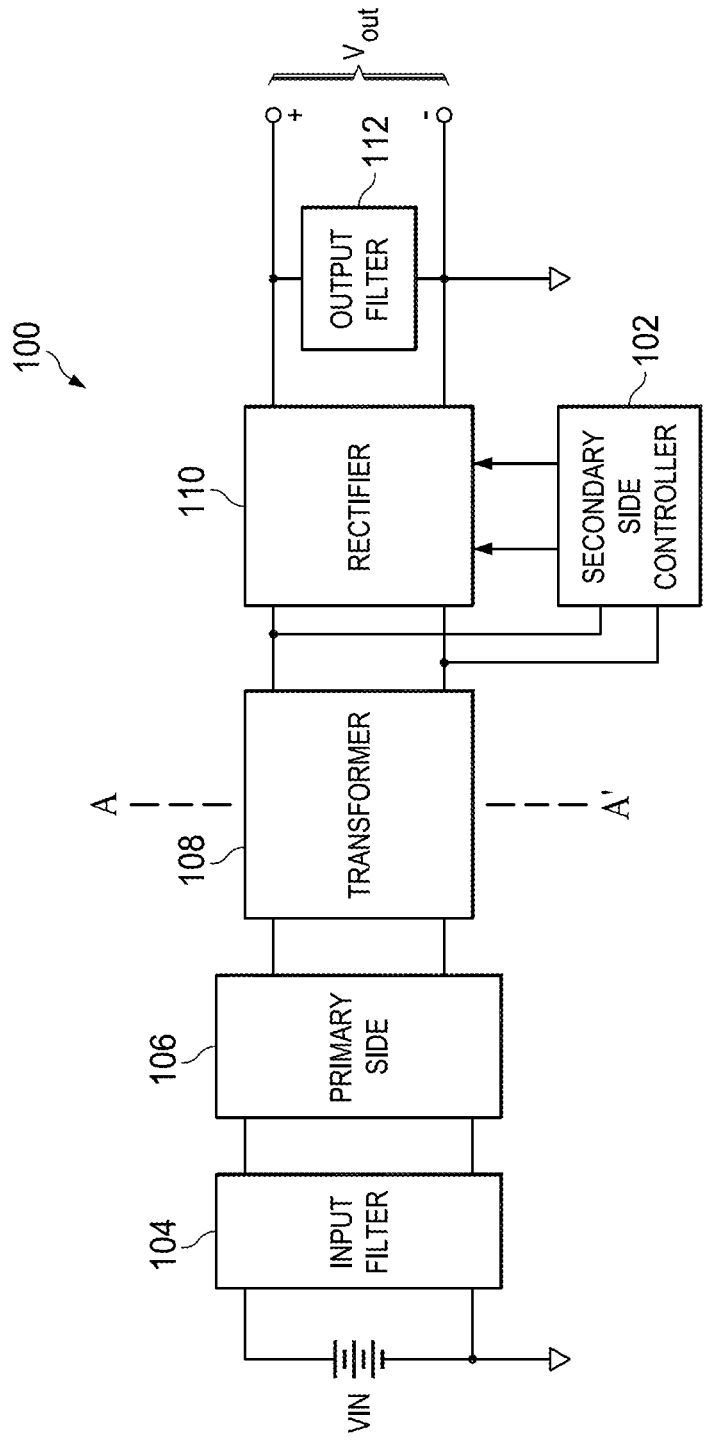
FIG. 1 illustrates a block diagram of an isolated dc/dc converter having a secondary side gate drive controller in accordance with an embodiment.

Referring initially to FIG. 1, a block diagram of an isolated dc/dc converter having a secondary side gate drive controller is illustrated in accordance with an embodiment. The isolated dc/dc converter 100 comprises an input filter 104, a primary side network 106, a transformer 108, a rectifier 110 and an output filter 112. In addition, the secondary side gate drive controller 102 is placed at the secondary side of the isolated dc/dc converter 100. It should be noted that as indicated by a dashed line A-A', the left side of the dashed line including the input dc source VIN, the input filter 104 and the primary side network 106 is commonly referred to as the primary side of the isolated dc/dc converter 100. On the other hand, the right side of the dashed line A-A' including the rectifier 110 and the output filter 112 is commonly referred to as the secondary side of the isolated dc/dc converter 100. Furthermore, as shown in FIG. 1, the transformer 108 is placed between the primary side and the secondary side. In fact, the transformer 108 provides electrical isolation between the primary side and the secondary side of the isolated dc/dc converter 100.

The primary side network 106 is coupled to the input dc source VIN through the input filter 104. Depending on different power converter topologies, the primary side network 106 may comprise different combinations of switches as well as passive components. For example, the primary side network 106 may comprise four switching elements connected in a bridge configuration when the isolated dc/dc converter 100 is a full bridge power converter. On the other hand, when the isolated dc/dc converter 100 is an LLC resonant converter, the primary side network 106 may comprise a high side switching element and a low side switching element connected in series, and a resonant tank formed by an inductor and a capacitor connected in series.

Furthermore, when the isolated dc/dc converter 100 may be an active clamp forward converter, the primary side network 106 may comprise a primary switch and an active clamp reset device formed by an auxiliary switch and a clamp capacitor. The detailed operation of active clamp forward converters will be discussed below with respect to FIG. 2. One of ordinary of skill in the art will realize that the isolated dc/dc converter 100 as well as its corresponding primary side network 106 may be implemented in many different ways. It should be noted that the power converter topologies discussed herein are provided for illustrative purposes only, and are provided only as examples of various embodiments.

The input filter 104 may comprise an inductor coupled between the input dc source VIN and the primary side network 106. The input filter 104 may further comprise a plurality of input capacitors. The inductor provides high impedance when switching noise tries to flow out of the primary side network 106. At the same time, the input capacitors shunt the input of the isolated dc/dc converter 100 and provide a low impedance channel for the switching noise generated from the primary side network 106. As a result, the switching noise of the isolated dc/dc converter 100 may be prevented from passing through the input filter 104. The structure and operation of the input filter of an isolated dc/dc converter are well known in the art, and hence are not discussed in further detail.

The transformer 108 provides electrical isolation between the primary side and the secondary side of the isolated dc/dc converter 100. In accordance with an embodiment, the transformer 108 may be formed of two transformer windings, namely a primary transformer winding and a secondary transformer winding. Alternatively, the transformer 108 may have a center tapped secondary so as to have three transformer windings including a primary transformer winding, a first secondary transformer winding and a second secondary transformer winding. It should be noted that the transformers illustrated herein and throughout the description are merely examples, which should not unduly limit the scope of the claims. One of ordinary skill in the art would recognize many variations, alternatives, and modifications. For example, the transformer 108 may further comprise a variety of bias windings and gate drive auxiliary windings.

The rectifier 110 converts an alternating polarity waveform received from the output of the transformer 108 to a single polarity waveform. The rectifier 110 may be formed of a pair of switching elements such as NMOS transistors. Alternatively, the rectifier 110 may be formed of a pair of diodes. Furthermore, the rectifier 110 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices and the like. The detailed operation and structure of the rectifier 110 are well known in the art, and hence are not discussed herein.

The output filter 112 is used to attenuate the switching ripple of the isolated dc/dc converter 100. According to the operation principles of isolated dc/dc converters, the output filter 112 may be an L-C filter formed by an inductor and a plurality of capacitors. One person skilled in the art will recognize that some isolated dc/dc converter topologies such as forward converters may require an L-C filter. On the other hand, some isolated dc/dc converter topologies such as LLC resonant converters may include an output filter formed by a capacitor. One person skilled in the art will further recognize that different output filter configurations apply to different power converter topologies as appropriate. The configuration variations of the output filter 112 are within various embodiments of the present disclosure.

FIG. 1 further illustrates a secondary side gate drive controller 102 coupled to the secondary side of the isolated dc/dc converter 100. More particularly, the secondary side gate drive controller 102 has two terminals coupled a transformer winding of the secondary side of the transformer 108. In addition, the secondary side gate drive controller 102 has the other two terminals coupled to the secondary side rectifier 110. In accordance with an embodiment, when the secondary side rectifier 110 is a synchronous rectifier formed by two controllable switches, the secondary side gate drive controller 102 may generate two gate drive signals for the two controllable switches respectively.

Furthermore, the secondary side gate drive controller 102 is capable of generating two complementary gate drive signals for the secondary side rectifier 110 when the isolated dc/dc power converter 100 operates in a synchronous rectifier mode. Moreover, the secondary side gate drive controller 102 is capable of adaptively reducing the dead time between the turn-on periods of the freewheeling switch and the forward switch of the secondary synchronous rectifier 110 so as to improve the efficiency of the isolated dc/dc power converter 100. The detailed operation of the secondary side gate drive controller 102 will be described below with respect to FIGS. 3-10.

Figure 2:
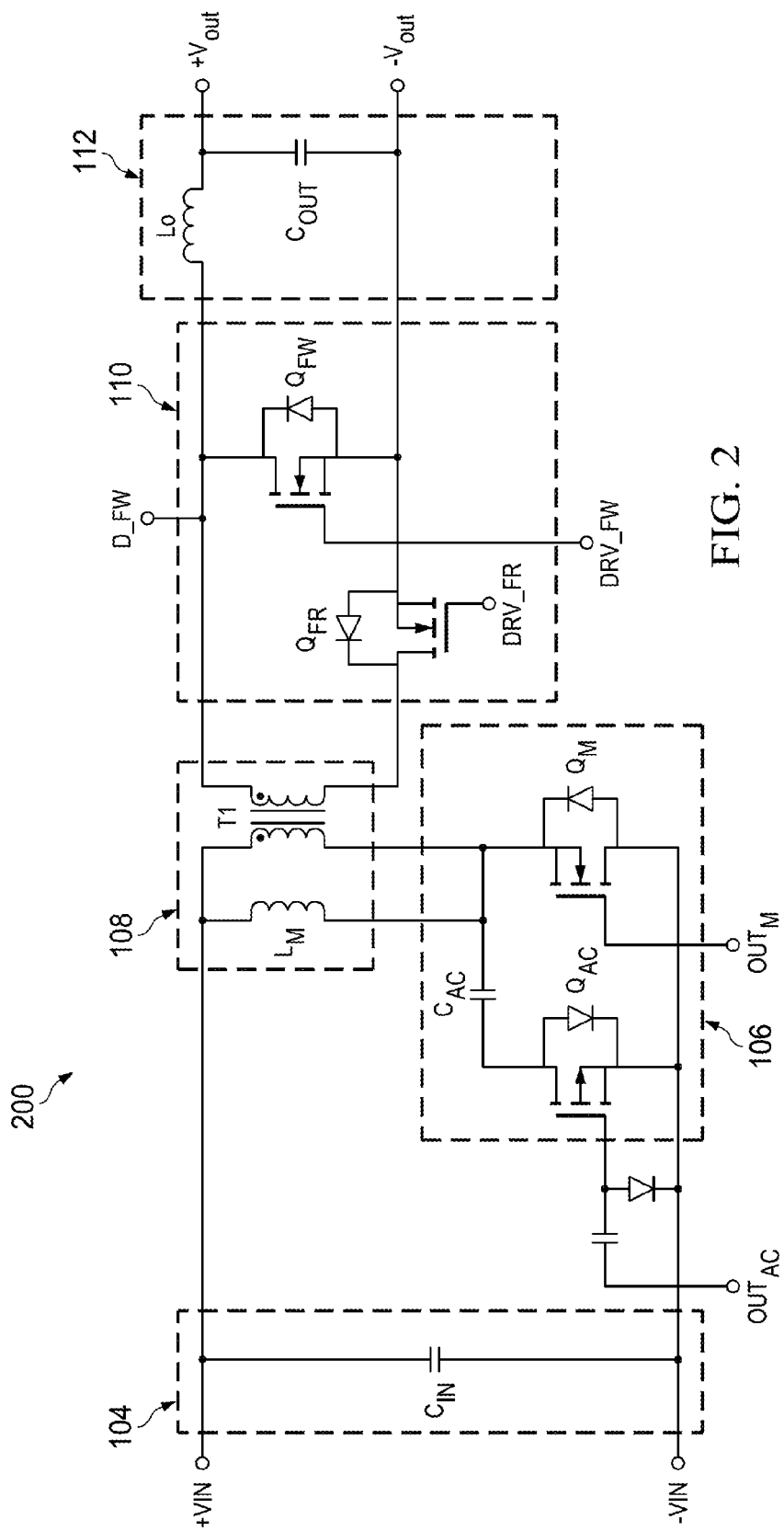
FIG. 2 illustrates a schematic diagram of an active clamp forward converter in accordance with an embodiment.

FIG. 2 illustrates a schematic diagram of an active clamp forward converter in accordance with an embodiment. An input voltage source VIN is coupled to a primary switch $Q_M$ through the primary winding of the transformer 108. For simplicity, throughout the description, the transformer 108 is alternatively referred to as transformer T1. The primary switch $Q_M$ is connected in parallel with an active clamp reset device formed by an auxiliary switch $Q_{AC}$ and a clamp capacitor $C_{AC}$ connected in series. In accordance with an embodiment, the primary switch $Q_M$ is an n-type MOSFET device. The auxiliary switch $Q_{AC}$ is a p-type MOSFET device. The clamp capacitor $C_{AC}$ is a 0.1 uF ceramic capacitor.

A primary pulse width modulation (PWM) controller (not shown) may generate two gate drive signals $OUT_M$ and $OUT_{AC}$ for the primary switch $Q_M$ and the auxiliary switch $Q_{AC}$ respectively. According to the operating principles of an active clamp forward converter, the amount of time D·T that the primary switch $Q_M$ conducts current during a switching period T is determined by a duty cycle D. The duty cycle D may have a value from 0 to 1. On the other hand, the amount of time that the auxiliary switch $Q_{AC}$ conducts current is approximately equal to (1−D)·T.

In accordance with an embodiment, the secondary rectifier 110 is formed by a forward switch $Q_{FW}$ and a freewheeling switch $Q_{FR}$. Both the forward switch $Q_{FW}$ and the freewheeling switch $Q_{FR}$ may be an n-type MOSFET device. It should be noted that the synchronous rectifier may be formed by other switching elements such as BJT devices, SJT devices, IGBT devices and the like. It should further be noted that while FIG. 2 illustrates a single switching element for either the forward switch $Q_{FW}$ or the freewheeling switch $Q_{FR}$, one of ordinary skill in the art would recognize many variations, alternatives, and modifications. For example, the forward switch $Q_{FW}$ may comprise a plurality of MOSFET devices connected in parallel.

As shown in FIG. 2, both the sources of the forward switch $Q_{FR}$ and the freewheeling switch $Q_{FW}$ are coupled together and further coupled to the negative terminal of the secondary output. The drain of the forward switch $Q_{FR}$ and the drain of the freewheeling switch $Q_{FW}$ are coupled to the secondary side transformer winding respectively. The forward switch $Q_{FR}$ and the freewheeling switch $Q_{FW}$ are driven by gate drive signals DRV_FR and DRV_FW respectively, which are generated by a secondary side gate drive controller (not shown but illustrated in FIG. 3). The detailed operation of the secondary side gate drive controller 102 will be discussed below with respect to FIGS. 3-8.

According to the operation principles of an active clamp forward converter, when the input voltage source VIN is applied to the primary side winding of the transformer T1 through the turn-on of the primary switch $Q_M$, the polarity of the secondary side winding of the transformer T1 is so configured that the secondary side positive output is coupled to the secondary side of the transformer T1 through the output inductor Lo and the turned-on forward switch $Q_{FR}$. On the other hand, when the primary side switch $Q_M$ is turned off, the secondary output is maintained by a freewheeling current path formed by the output inductor Lo and the turned on freewheeling switch $Q_{FW}$.

It should be noted that both the forward switch $Q_{FR}$ and the freewheeling switch $Q_{FW}$ may comprise a body diode as shown in FIG. 2. The body diode may conduct current in some periods such as the dead time period between the turn-on periods of the forward switch $Q_{FR}$ and the freewheeling switch $Q_{FW}$. As known in the art, in comparison with synchronous rectification, slow reverse recovery body diodes may have a 0.6V to 0.8V forward voltage drop. Such a large voltage drop may cause extra conduction power losses. In addition, the slow reverse recovery characteristic of body diodes may result in extra switching losses. In sum, the turn-on periods of the forward switch $Q_{FR}$ and the freewheeling switch $Q_{FW}$ are mutually exclusive. There may be a dead time period between the turn-on periods of the forward switch $Q_{FR}$ and the freewheeling switch $Q_{FW}$. Either the body diode of the freewheeling switch or the body diode of the forward switch may conduct during the dead time period.

Figure 3:
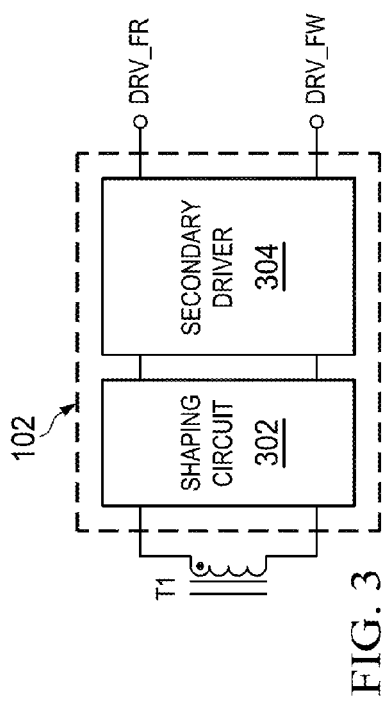
FIG. 3 illustrates a block diagram of the secondary side gate drive controller in accordance with an embodiment.

FIG. 3 illustrates a block diagram of the secondary side gate drive controller in accordance with an embodiment. The secondary side gate drive controller 102 may comprise a signal shaping circuit 302 and a secondary side gate driver 304. The signal shaping circuit 302 is coupled to a secondary winding of the transformer T1. One skilled in the art will recognize that the winding shown in FIG. 3 is an auxiliary winding coupled to the transformer T1. Alternatively, the winding shown in FIG. 3 may be a secondary power winding of the transformer T1.

The signal shaping circuit 302 is used to eliminate the noise contamination of the switching signal detected from the winding shown in FIG. 3. The detailed schematic diagram of the signal shaping circuit 302 will be discussed in detail with respect to FIG. 4. The secondary side gate driver 304 receives the signals from the signal shaping circuit 302 and further generates a pair of gate drive signals, namely DRV_FR and DRV_FW for the secondary synchronous rectifier 110 (not shown but illustrated in FIG. 2). More particularly, when the secondary of the active clamped forward converter operates in a synchronous rectifier mode, the gate drive signals for the forward switch $Q_{FR}$ and the freewheeling switch $Q_{FW}$ are generated by the secondary side gate drive controller 102. Furthermore, the dead time between the turn-on of the forward switch $Q_{FR}$ and the turn-on of the freewheeling switch $Q_{FW}$ is controlled by the secondary side gate drive controller 102 based upon a PWM signal PWM_IN detected from the auxiliary winding shown in FIG. 3.

It should be noted that the secondary gate drive controller 102 is capable of generating the gate drive signals DRV_FR and DRV_FW without relying on a dedicated signal transformer across the isolation boundary (illustrated in FIG. 1) between the primary side and the secondary side of the transformer T1. As shown in FIG. 3, by employing a signal shaping circuit 302, the secondary gate driver 304 receives PWM_IN, which is derived from an auxiliary winding of the main power transformer T1 (shown in FIG. 2). The signal shaping circuit may be a dc voltage restorer, a dc level shifter or the like. It should be noted that the secondary side controller shown in FIG. 3 can minimize the dead time as well as power losses without relying on timing signals from the primary side controller (not shown). In particular, the secondary side controller 102 can adaptively reduce the dead time without a dedicated device across the isolation boundary. The detailed operation of secondary side gate driver 304 will be discussed in FIGS. 4-8.

Figure 4:
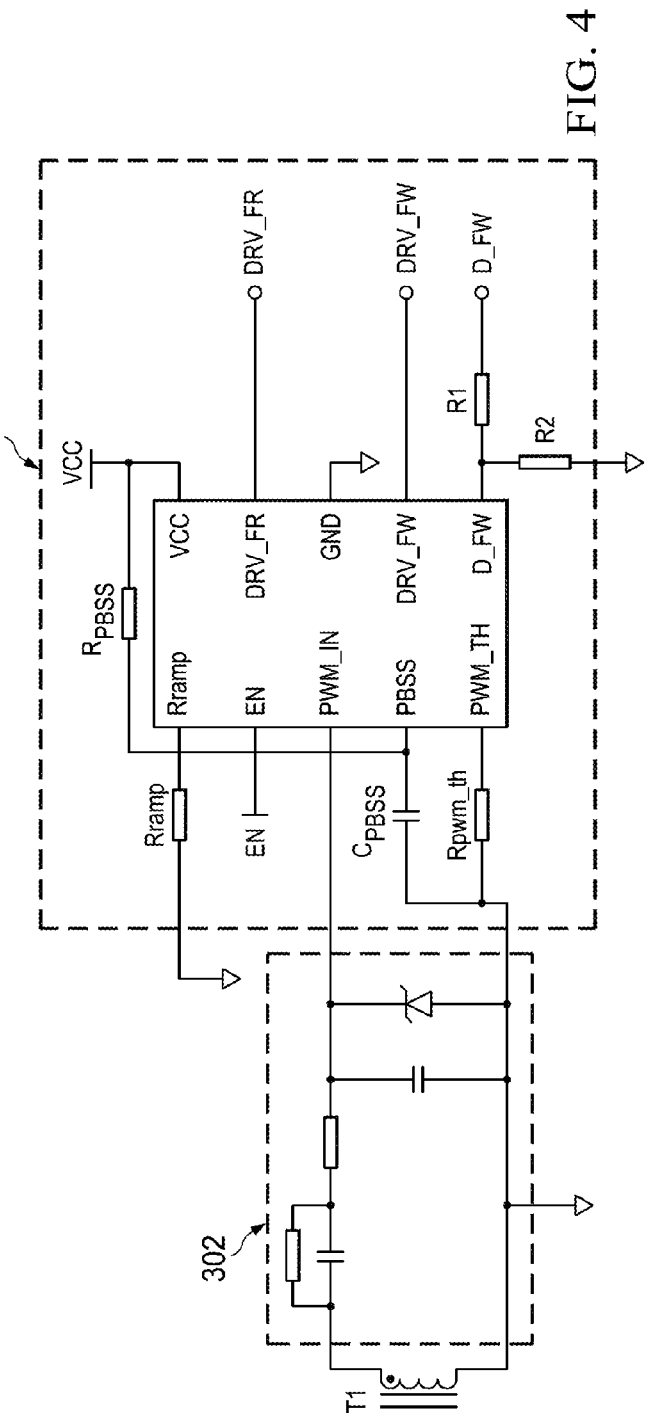
FIGS. 4 illustrates a schematic diagram of a secondary side gate drive controller in accordance with an embodiment.

FIG. 4 illustrates a schematic diagram of a secondary side gate driver in accordance with an embodiment. As shown in FIG. 4, the secondary side gate driver 304 may have ten input and output terminals. It should be noted that the secondary side gate driver 304 is capable of generating the gate drive signals, DRV_FR and DRV_FW without relying on the primary PWM signal generated by the primary side PWM controller (not shown). In particular, it is not necessary to employ an isolation device such as a signal transformer to transfer the primary side PWM signal across the isolation boundary. Instead, the secondary side gate driver 304 receives PWM_IN signal from the transformer windings shown in FIG. 4 through the signal shaping circuit 302. Based upon the PWM_IN signal and several adjustable parameters such as PWM_TH, the secondary side gate driver 304 is capable of generating two complementary gate drive signals DRV_FR and DRV_FW for the forward switch $Q_{FR}$ and the freewheeling switch $Q_{FW}$ respectively. Furthermore, the secondary side gate driver 304 is able to reduce the dead time between the turn-on period of the freewheeling gate drive signal DRV_FW and the turn-on period of the forward gate drive signal DRV_FR so as to improve the efficiency of the isolation dc/dc converter 200 shown in FIG. 2.

FIG. 5 illustrates a schematic diagram of a half wave rectifier for generating an internal threshold waveform in accordance with an embodiment. The half wave rectifier 502 is located inside the secondary side gate driver 304. The half wave rectifier 502 is formed by a diode rectifier and a resistor divider. More particularly, the diode rectifier comprises a diode D1, a first resistor R1 and a capacitor C1. The resistor divider may comprise a second resistor R2 and a third resistor R3. As shown in FIG. 5, the input of the half wave rectifier is coupled to PWM_IN, which is detected from the transformer winding T1 shown in FIG. 4. The operation of half-wave rectifiers is well known in the art, and hence is not discussed in further detail herein.

As shown in FIG. 5, PWM_th_f is an internal voltage waveform generated from PWM_IN. In particular, when a logic state of PWM_IN is applied to the capacitor C1 through the diode D1 and the first resistor R1, the capacitor C1 is charged up to a higher voltage level. On the other hand, when PWM_IN changes to a logic low state. The diode D1 prevents C1 from being discharged by PWM_IN. Instead, C1 is discharged by the resistor divider formed by the second resistor R2 and the third resistor R3.

PWM_th_f is used as a PWM falling threshold. In other words, when PWM_IN falls below PWM_th_f, an internal PWM signal PWM_D goes low after a propagation delay. The detailed operation of PWM_D will be described below with respect to FIG. 7 and FIG. 8. One advantageous feature of having PWM_th_f is that the falling of PWM_IN can be detected as early as possible by comparing PWM_IN with PWM_th_f.

Figure 6:
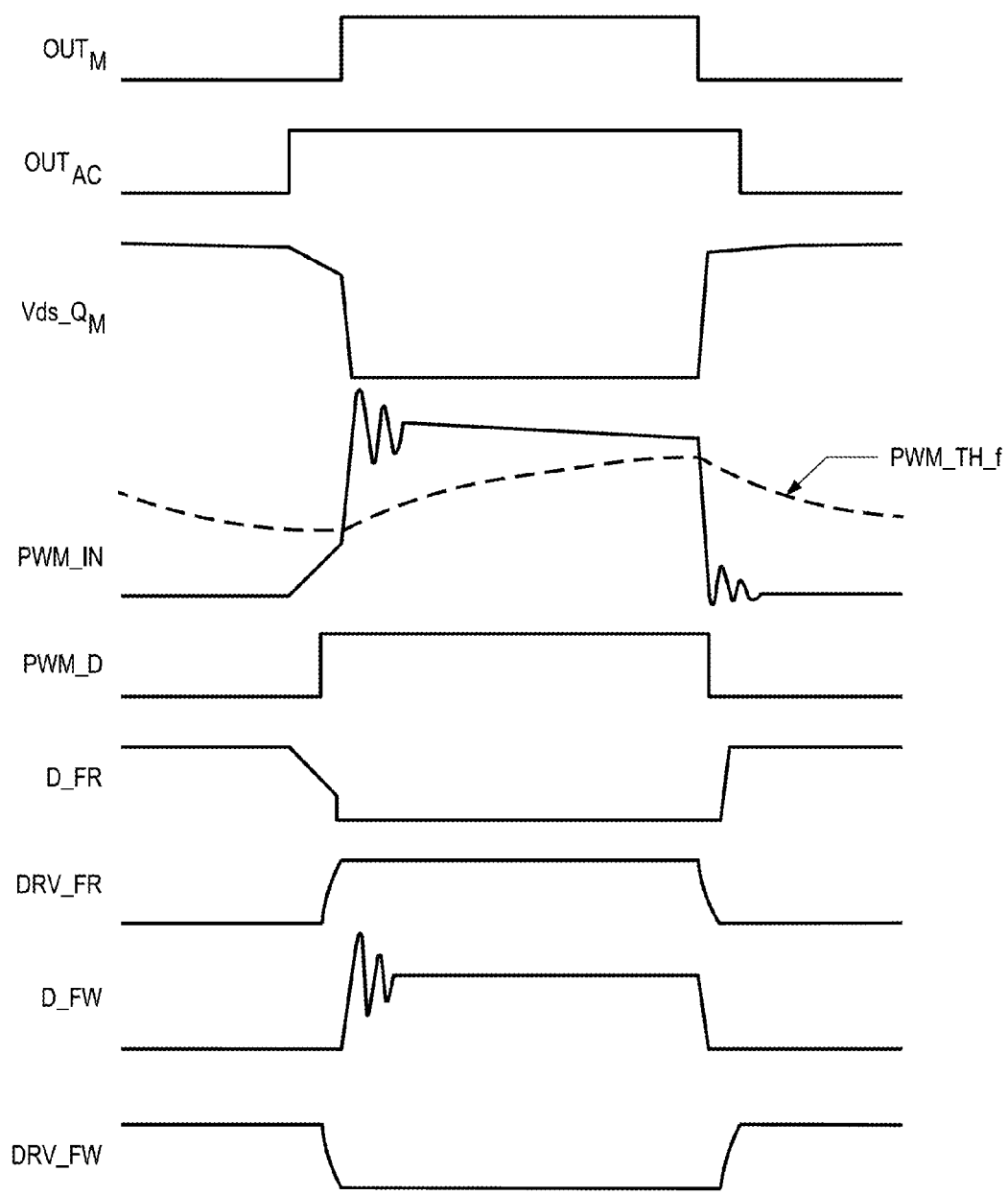
FIG. 6 is a graph illustrating timing diagrams of various signals for an active clamped forward converter operating in a synchronous rectifier mode in accordance with an embodiment.

FIG. 6 is a graph illustrating timing diagrams of various signals for an active clamped forward converter operating in a synchronous rectifier mode in accordance with an embodiment. $OUT_M$ is a gate drive signal for the main switch $Q_M$ of the active clamp forward converter 200 shown in FIG. 2. $OUT_{AC}$ is a gate drive signal for the auxiliary switch $Q_{AC}$ shown in FIG. 2. Vds_$Q_M$ is a voltage waveform across the drain and the source of the main switch $Q_M$. PWM_IN is a PWM input signal generated from the auxiliary winding (illustrated in FIG. 4) and fed to the secondary side gate driver 304 (shown in FIG. 4). It should be noted that a threshold between PWM_IN low and PWM_IN high can be set by an external resistor (e.g., $R_{pwm\_th}$) connected between PWM_TH pin of the secondary gate driver 304 and ground. Such a threshold is referred to as PWM_TH in FIG. 7.

PWM_D is a PWM signal derived from PWM_IN. It should be noted that PWM_D is located inside the secondary side gate driver 304. D_FR is a voltage waveform across the drain and the source of the forward switch $Q_{FR}$ shown in FIG. 2. DRV_FR is the gate drive signal of the forward switch $Q_{FR}$. D_FW is a voltage waveform across the drain and the source of the freewheeling switch $Q_{FW}$ shown in FIG. 2. DRV_FW is the gate drive signal of the freewheeling switch $Q_{FW}$.

Figure 7:
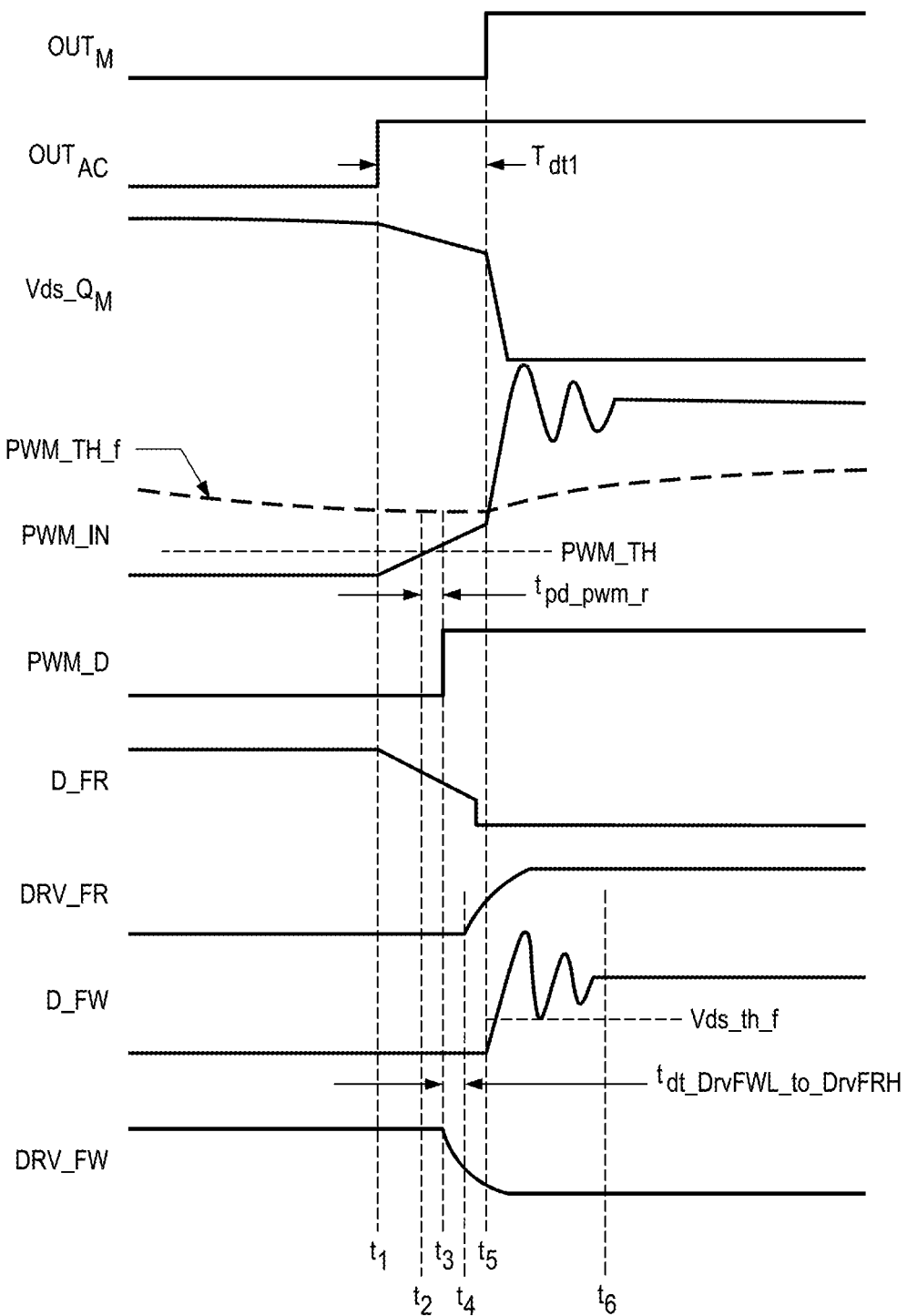
FIG. 7 is a graph illustrating a zoomed-in portion of the first switching transition between the freewheeling switch turn-off and the forward switch turn-on shown in FIG. 6.

FIG. 7 is a graph illustrating a zoomed-in portion of the first switching transition between the freewheeling switch turn-off and the forward switch turn-on shown in FIG. 6. At time period t1-t2, the leading edge of $OUT_{AC}$ occurs at t1. As shown in FIG. 2, the auxiliary switch $Q_{AC}$ is a p-type MOSFET device. As a result, the leading edge of $OUT_{AC}$ turns off the auxiliary switch $Q_{AC}$. Accordingly, the drain-to-source voltage Vds_$Q_M$ starts to decrease. At the same time, the drain-to-source voltage of the forward switch D_FR starts to decrease because D_FR is proportional to the difference between Vds_$Q_M$ and VIN in accordance with the operation principle of active clamp forward converters.

During time period t1-t2, PWM_IN starts to gradually increase. At t2, PWM_IN reaches the predetermined threshold PWM_TH. After a propagation delay $t_{pd\_pwm\_r}$, PWM_D changes from a logic low state to a logic high state at t3 and the gate drive signal DRV_FW starts to decrease at t3. As a result, the freewheeling switch $Q_{FW}$ is turned off when DRV_FW is less than the threshold voltage of the freewheeling switch $Q_{FW}$. After a fixed delay $t_{dt\_DrvFWL\_to\_DrvFRH}$, the gate drive signal DRV_FR starts to increase from a logic low level to a logic high level at t4. At t5, the main switch $Q_M$ is turned on in response to the logic state change at the main switch gate drive signal $OUT_M$.

As shown in FIG. 7, there is a gap $T_{dt1}$ between the leading edge of $OUT_{AC}$ and the leading edge of $OUT_M$. Such a gap is the dead time between the turn-on of the main switch $Q_M$ and the turn-off of auxiliary switch $Q_{AC}$. In accordance with the operation of the secondary side controller 102, Vds_th_f is a threshold for detecting the logic status change at D_FW. In other words, when D_FW is less than Vds_th_f, the status of D_FW is considered to be a logic low state. On the other hand, when D_FW is greater than Vds_th_f, the status of D_FW is considered to be a logic high state.

Furthermore, the secondary side gate driver 304 uses the status of D_FW to determine the gate drive signal of the freewheeling switch $Q_{FW}$. For example, the secondary side gate driver 304 may set DRV_FW to a logic high state after D_FW drops below Vds_th_f. However, there may be a plurality of leading edge spikes at either the forward switch $Q_{FR}$ or the freewheeling switch $Q_{FW}$. Without a leading edge blanking period, the spikes may trigger a false turn-on of a switch. As shown in FIG. 7, the switching spikes at D_FW may cause false triggering because the lowest point of the switching spikes shown in FIG. 7 between the interval t5 to t6 may touch the predetermined threshold Vds_th_f. In order to prevent false triggering, a leading edge blanking period may be employed. In FIG. 7, the leading edge blanking period is from t5 to t6. In addition, another signal blanking window located between t3 and t6 may be employed to avoid false triggering of PWM_D.

FIG. 7 also illustrates a dead time $t_{dt\_DrvFWL\_to\_DrvFRH}$ between the gate drive of the freewheeling switch DRV_FW and the gate drive of the forward switch DRV_FR. The dead time $t_{dt\_DrvFWL\_to\_DrvFRH}$ is located between t3 and t4 in FIG. 7. In accordance with an embodiment, the dead time $t_{dt\_DrvFWL\_to\_DrvFRH}$ may be set to a short time such as 0 ns.

Figure 8:
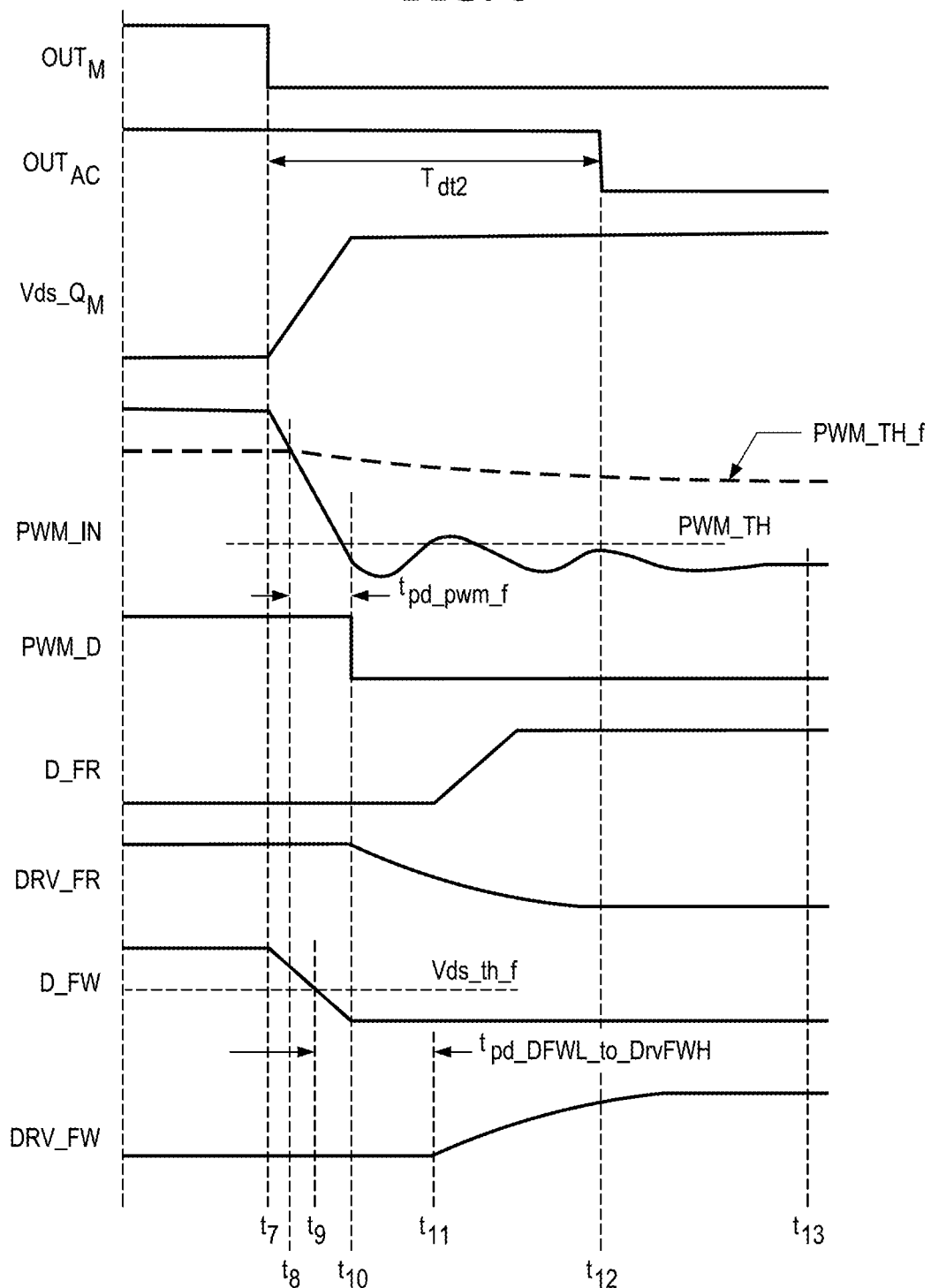
FIG. 8 is a graph illustrating a zoomed-in portion of the second switching transition between the forward switch turn-off and the freewheeling switch turn-on shown in FIG. 6.

FIG. 8 is a graph illustrating a zoomed-in portion of the second switching transition between the forward switch turn-off and the freewheeling switch turn-on shown in FIG. 6. At time period t7-t8, the falling edge of the main switch gate drive signal $OUT_M$ occurs at t7. As a result, the main switch $Q_M$ is turned off. Accordingly, the drain-to-source voltage $Vds\_Q_M$ starts to increase. At the same time, the drain-to-source voltage of the freewheeling switch D_FW starts to decrease because D_FW is complementary to $Vds\_Q_M$ in accordance with the operation principle of active clamp forward converters.

During time period t7-t8, PWM_IN starts to decrease. At t8, PWM_IN crosses the threshold PWM_th_f. After a propagation delay $t_{pd\_pwm\_f}$, PWM_D changes from a logic high state to a logic low state at t10. During the same period, D_FW drops to Vds_th_f at t9. After another propagation delay $t_{pd\_DFWL\_to\_DrvFWH}$, the gate drive signal DRV_FW starts to increase from a low level to a high level at t11. At t12, the auxiliary switch $Q_{AC}$ is turned on in response to the logic state change at $OUT_{AC}$.

As shown in FIG. 8, there is a gap $T_{dt2}$ between the leading edge of $OUT_{AC}$ and the leading edge of $OUT_M$. Such a gap between t7 and t12 is the dead time between the turn-off of the main switch $Q_M$ and the turn-on of the auxiliary switch $Q_{AC}$. There may be a trailing edge blanking period at PWM_IN to avoid false triggering. As shown in FIG. 8, such a trailing edge blanking period is located between t10 and t13. In addition, FIG. 8 illustrates two propagation delays. The first propagation delay is between t8 and t10 and the second propagation delay is between t9 and t11.

FIG. 9 illustrates a flow chart of a synchronous rectifier adaptive dead time control scheme in accordance with an embodiment. At step 900, a switching power supply employing the adaptive dead time control scheme described with respect to FIG. 7 turns off the primary side auxiliary switch in response to a turn-off signal from the primary side PWM controller. At step 910, if the PWM_IN is less than PWM_TH, then the algorithm keeps checking the status of PWM_IN until PWM_IN is greater than PWM_TH. On the other hand, if PWM_IN increases and eventually passes PWM_TH, the algorithm executes step 920 wherein the algorithm sets PWM_D to a logic high state after a propagation delay. At step 930, the secondary gate drive controller turns off the freewheeling switch $Q_{FW}$ and turns on the forward switch $Q_{FR}$. At step 940, the secondary gate drive controller turns on the primary side switch $Q_M$.

FIG. 10 illustrates a flow chart of a synchronous rectifier dead time control scheme in accordance with another embodiment. At step 1000, a switching power supply employing the adaptive dead time control scheme described with respect to FIG. 8 turns off the primary side main switch in response to a turn-off signal from the primary side PWM controller. At step 1110, if the PWM_IN is greater than PWM_TH_f, then the algorithm keeps checking the status of PWM_IN until PWM_IN is less than PWM_TH_f. On the other hand, if PWM_IN decreases down to a level below PWM_TH_f, the algorithm executes step 1120 wherein the algorithm sets PWM_D to a logic low state after a propagation delay. At step 1130, the secondary gate drive controller turns off the forward switch. At step 1140, if the D_FW is greater than Vds_th_f, then the algorithm keeps checking the status of D_FW until D_FW is less than Vds_th_f. On the other hand, if D_FW decreases down to a level below Vds_th_f, the algorithm executes step 1150 wherein the algorithm turns on DRV_FW.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
   a secondary synchronous rectifier coupled to a secondary side of a power converter comprising a forward switch and a freewheeling switch; and
   a secondary gate drive controller coupled to a transformer winding of the power converter to provide a forward gate drive signal for the forward switch and a freewheeling gate drive signal for the freewheeling switch, wherein the secondary gate drive controller generates a dead time between the forward gate drive signal and the freewheeling gate drive signal, and wherein the secondary gate drive controller generates a turn-off threshold of the forward switch, and wherein the turn-off threshold is generated by applying a voltage across the transformer winding to a first capacitor through a signal shaping circuit and a half wave rectifier, wherein the signal shaping circuit comprises a second capacitor, a third capacitor, a first resistor between the second capacitor and the third capacitor and a first diode in parallel with the third capacitor, and wherein an input of the signal shaping circuit is connected to the transformer winding, an output of the signal shaping circuit is connected to a diode of the half wave rectifier, and an output of the half wave rectifier is coupled to the first capacitor, and wherein the first capacitor is discharged by a resistor divider connected in parallel with the first capacitor, and wherein, after passing the signal shaping circuit, the voltage across the transformer winding is directly compared with the turn-off threshold to determine a turn-off of the forward switch.

2. The apparatus of claim 1, wherein the transformer winding is a power transformer winding coupled to the forward switch and the freewheeling switch.

3. The apparatus of claim 1, wherein the transformer winding is an auxiliary transformer winding magnetically coupled to a transformer of the power converter.

4. The apparatus of claim 1, wherein the signal shaping circuit is coupled between the transformer winding and the secondary gate drive controller.

5. A system comprising:
  a transformer of a power converter having a primary winding coupled to a dc power source through a primary switch and a secondary winding coupled to an output filter;
  a secondary synchronous rectifier coupled between the secondary winding and the output filter comprising a forward switch and a freewheeling switch; and
  a secondary gate drive controller coupled to a transformer winding to provide a forward gate drive signal for the forward switch and a freewheeling gate drive signal for the freewheeling switch, wherein the secondary gate drive controller generates a dead time between the forward gate drive signal and the freewheeling gate drive signal, and wherein the secondary gate drive controller generates a turn-off threshold of the forward switch, and wherein the turn-off threshold is generated by applying a voltage across the transformer winding to a first capacitor through a signal shaping circuit and a half wave rectifier, wherein the signal shaping circuit comprises a second capacitor, a third capacitor, a first resistor connected between the second capacitor and the third capacitor and a first diode in parallel with the third capacitor, and wherein an input of the signal shaping circuit is connected to the transformer winding, an output of the signal shaping circuit is connected to a diode of the half wave rectifier, and an output of the half wave rectifier is coupled to the first capacitor, and wherein the diode of the half wave rectifier is connected to the first capacitor through a resistor, and a resistor divider is connected in parallel with the first capacitor, and wherein a midpoint of the resistor divider is configured to generate the turn-off threshold, and wherein a voltage at the output of the signal shaping circuit is directly compared with the turn-off threshold to determine a turn-off of the forward switch.

6. The system of claim 5, wherein the power converter is selected from the group consisting of a forward converter, a flyback converter, a half bridge converter, a full bridge converter and a push-pull converter.

7. The system of claim 5, wherein the power converter adaptively adjusts the dead time between the forward gate drive signal and the freewheeling gate drive signal.

8. The system of claim 5, further comprising an active reset device connected in parallel with the primary switch, wherein the active reset device comprises:
  an auxiliary switch; and
  a reset capacitor connected in series with the auxiliary switch.

9. The system of claim 8, further comprising a primary side controller configured to:
  generate a primary switch gate drive signal; and
  generate an auxiliary switch gate drive signal, wherein the auxiliary switch gate drive signal is approximately complementary to the primary switch gate drive signal.

10. A method comprising:
  detecting a switching pulse from a transforming winding of a power converter;
  generating a forward switch gate drive signal for the power converter, wherein a turn-off threshold of the forward switch gate drive signal is generated by applying the switching pulse of the transformer winding to a capacitor through a signal shaping circuit and a half wave rectifier, wherein an input of the signal shaping circuit is coupled to the transformer winding, an output of the signal shaping circuit is coupled to an input of the half wave rectifier, and an output of the half wave rectifier is coupled to the capacitor;
  generating a freewheeling switch gate drive signal complementary to the forward switch gate drive signal for the power converter;
  generating a dead time between the forward switch gate drive signal and the freewheeling switch gate drive signal;
  generating a first blanking period after a leading edge of a drain-to-source voltage of a freewheeling switch; and
  generating a second blanking period after a falling edge of an internal PWM signal.

11. The method of claim 10, further comprising:
  comparing a detected signal from the transformer winding with a first predetermined threshold;
  generating a leading edge of the internal PWM signal after a first delay;
  setting the freewheeling gate drive signal to a logic low state; and
  setting the forward switch gate drive signal to a logic high state after a second delay.

12. The method of claim 10, further comprising:
  generating an internal waveform from a detected signal from the transformer winding using a rectifier;
  comparing the detected signal from the transformer winding with the internal waveform;
  generating the falling edge of the internal PWM signal after a third delay;
  setting the forward gate drive signal to a logic low state;
  comparing the drain-to-source voltage of the freewheeling switch with a second predetermined threshold; and
  setting the freewheeling switch gate drive signal to a logic high state after a fourth delay.

13. The method of claim 10, further comprising:
  detecting the switching pulse from a transforming power winding coupled to a forward switch and a freewheeling switch of the power converter.

14. The method of claim 10, further comprising:
detecting the switching pulse from a transforming auxiliary winding magnetically coupled to a transformer of the power converter.

15. The method of claim 10, further comprising:
configuring a secondary side gate drive controller such that the power converter adaptively adjusts the dead time between the forward switch gate drive signal and the freewheeling switch gate drive signal.

16. The method of claim 10, further comprising:
generating a first predetermined threshold indicating a leading edge of a detected signal from the transformer winding;
generating a second predetermined threshold indicating a falling edge of the detected signal from the transformer winding; and
generating a third predetermined threshold indicating a falling edge of a drain-to-source voltage of the freewheeling switch.

17. The method of claim 16, further comprising:
adjusting the first predetermined threshold by using a resistor coupled to a secondary gate drive controller.

\* \* \* \* \*